United States Patent
Pernu et al.

(10) Patent No.: US 6,567,501 B1
(45) Date of Patent: May 20, 2003

(54) METHOD AND A SYSTEM FOR TRANSMITTING ALARMS

(75) Inventors: Sakari Pernu, Utajärvi (FI); Veli-Matti Harinen, Oulu (FI); Keijo Hasa, Oulu (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/786,769

(22) PCT Filed: Sep. 13, 1999

(86) PCT No.: PCT/FI99/00742

§ 371 (c)(1),
(2), (4) Date: May 8, 2001

(87) PCT Pub. No.: WO00/16584

PCT Pub. Date: Mar. 23, 2000

(30) Foreign Application Priority Data

Sep. 11, 1998 (FI) .................................................. 981946

(51) Int. Cl.[7] ........................... H04M 1/24; H04M 11/04
(52) U.S. Cl. ........................ 379/32.01; 379/33; 379/37; 379/1.01; 379/9; 379/14.01; 379/29.04; 340/501; 340/3.43
(58) Field of Search ............................. 379/37, 33, 40, 379/41, 45, 399.01, 401, 412, 413, 29.03, 29.04, 1.01, 2, 7, 9, 14.01, 10.01, 15.01, 22, 22.01, 24, 27.01, 27.03, 27.04, 29.01, 44, 47; 340/500, 501, 506, 533, 541, 635, 657, 3.1, 3.43, 3.9, 825.36

(56) References Cited

U.S. PATENT DOCUMENTS

| | | | | |
|---|---|---|---|---|
| 4,262,283 A | * | 4/1981 | Chamberlain et al. | 340/533 |
| 4,993,059 A | * | 2/1991 | Smith et al. | 379/39 |
| 5,027,383 A | * | 6/1991 | Sheffer | 379/39 |
| 5,426,688 A | * | 6/1995 | Anand | 379/10.01 |
| 5,568,542 A | * | 10/1996 | Borshchevsky et al. | 379/171 |
| 5,598,455 A | * | 1/1997 | Bliven et al. | 379/27.01 |
| 5,708,364 A | * | 1/1998 | Vokey et al. | 324/523 |
| 5,828,978 A | * | 10/1998 | Anand et al. | 701/117 |
| 5,956,388 A | * | 9/1999 | Parker et al. | 379/42 |

* cited by examiner

Primary Examiner—Binh Tieu
Assistant Examiner—Quoc Tran
(74) Attorney, Agent, or Firm—Antonelli, Terry, Stout & Kraus, LLP

(57) ABSTRACT

A method for transferring alarms, in which method a predetermined area (1) is monitored by a monitoring device (24) connected to a subscriber line (10, 12, 14); the condition of the subscriber line (10, 12, 14) is monitored by line testing; when the ISDN subscriber line (10, 12, 14) lacks functionality an alarm is identified in a switching center (20); and from the switching center (20) the alarm is directed to an alarm monitoring system.

10 Claims, 4 Drawing Sheets

FIG. 2
| SUBSCRIBER CONNECTION TABLE | | | |
|---|---|---|---|
| SUBSCRIBER PLACE NO. | ACTIVITY | DESTINATION | MESSAGE |
| 1123456 | YES | 378910 | UUS |
| 2345678 | NO | alarmtd@alarm.fi | e-mail |
FIG. 3
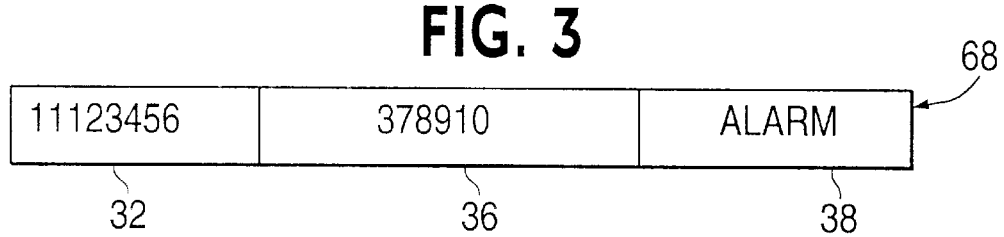
FIG. 6
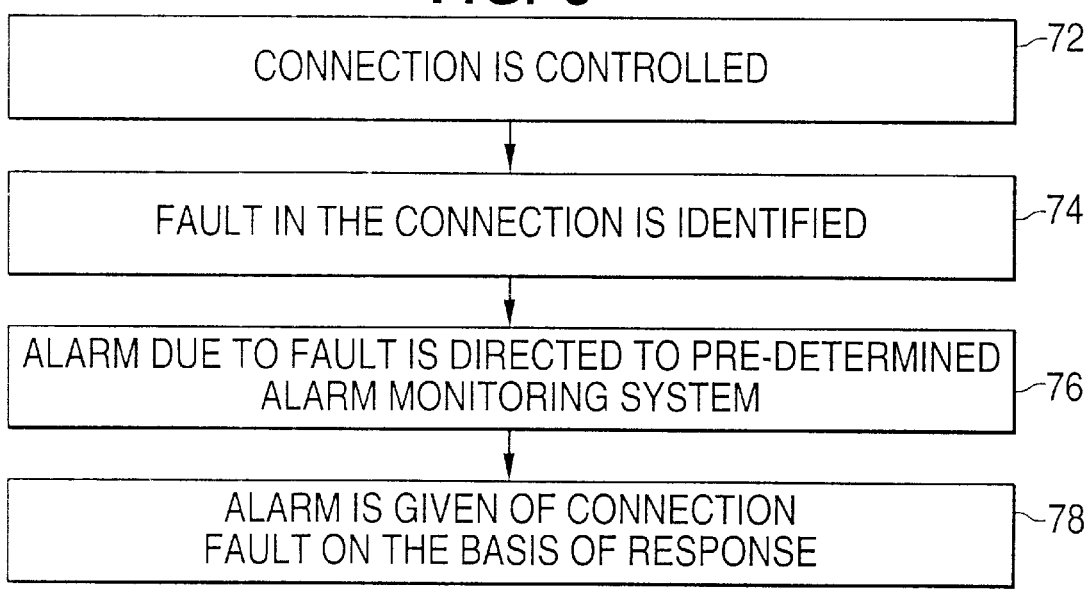

METHOD AND A SYSTEM FOR TRANSMITTING ALARMS

BACKGROUND OF THE INVENTION

The present invention relates to a method and a system for transmitting alarms, particularly, for transmitting alarms of a fault detected in a connection between an area to be monitored and a control and switching system.

For maintaining safety and due to possible unexpected events, buildings and other premises and/or their functions are monitored either all the time or temporarily. Often, property is kept on these premises which one does not want thieves to get their hands on or one wants to prevent the property from being destroyed. Functions, such as heating, that are on the premises can also be monitored. Fire alarms can be used to sound an alarm so that people who are sleeping are woken up by a loud noise. An elderly person can be monitored or he/she may have an alarm with which a connection can be established to an alarm centre. Several alarms or monitoring functions can be interconnected by means of a network.

Thus, the purpose of a safety system is to reveal and give a signal of circumstances that are unusual or dangerous, such as e.g. moving, unauthorised access, breaking of glass, a fire, smoke, high/low water surface level. The location and storage of a boat or vehicle, etc. in a protected area can also be monitored. Monitoring is carried out by different kinds of sensors placed at the object, which sensors register a change and which have a transmitter or they are in connection with the alarm collection place of the object by means of a network.

The transfer of an alarm and a monitoring function to an alarm centre is transmitted through a telephone subscription line and through network elements. A subscriber's telephone is used to call a pre-determined number in response to a message given by an alarm observation means.

At the alarm centre or where the alarm has gone, the monitoring of the object can be started, e.g. so that the alarm causes a monitoring camera to operate at the object. The picture is transmitted through a telephone network, e.g. ISDN, to a control place, where the reason for the movement can be followed.

More particularly, the use of ISDN is described, e.g. in the WO publication 9702694, where a telephone network, particularly ISDN (Integrated Services Digital Network), is used for transmitting an alarm. An alarm received from an alarm detection unit placed at the object to be monitored is transferred to an alarm centre through a digital data transmission network. When an alarm is given, the telephone number of the caller of the alarm detection unit is transferred, according to the publication, as alarm information through ISDN channel D. The alarm centre uses this number to generate alarm display to the monitored place before a connection is established through ISDN channel B, e.g. as an audio-video connection. A computer connected to a subscriber connection of the monitored place collects alarm information and "gives an alarm" by establishing a call to a pre-programmed subscriber connection. A defect is that information about the alarm cannot be obtained if the subscriber line is cut or it short-circuits (intentionally or unintentionally).

SUMMARY OF THE INVENTION

In the invention, the properties of the physical layer of an ISDN line are utilised in the implementation of an alarm system and, thus, it is part of the alarm system. With the help of the invention, one both takes safeguards against vandalism and simultaneously monitors the object. According to the invention, no special terminal (computer) is required that indicates an alarm, but the information of a fault is detected in a network. An alarm can be transferred to a pre-determined subscriber connection. When the subscriber line ceases to function, an alarm facility will be activated. One possible solution that can be used is continuous line testing. By using the properties of ISDN line's physical layer the line testing can be done by monitoring in the telephone centre the current feeding to the ISDN-terminal placed in the area to be monitored from the telephone centre. Alternatively the line testing can be done in addition to the aforementioned monitoring by monitoring in the centre the synchronization between the centre and the terminal. The alarm is detected in the centre by an increase of current feeding to the terminal and possibly detected, in addition to that, by loss of synchronization between the centre and the terminal. The cut-off of the line between the centre and the terminal is detected by the loss of synchronization between the centre and the terminal in the centre. During testing, it would be noticed if the line has been cut off for some reason other than a good cause, i.e. the testing interval can be changed after a fault has been detected for the first time to discover whether the error message is real or only temporary. When it is a question of a temporary fault, an alarm would not be given, i.e. an error message would be discovered to be a false alarm. An error message can be based either on that:

The line has been broken or the line has "short-circuited".

Now an alarm system has been invented, where, according to a first aspect of the invention, there is provided an-alarm system comprising a control and switching system, a terminal at an area to be monitored, a first connection between the terminal and the control and switching system, and the control and switching system is arranged to monitor the first connection between the control and switching system and the terminal, characterised in that the first connection comprises a power feed line for feeding power from the control and switching system to the terminal, and the control and switching system is arranged to give an alarm to a pre-determined alarm monitoring system in response to detecting an increase of current over a predetermined threshold value in the power feed line, and according to second aspect of the invention there is provided a method for transferring alarms in an alarm system, the system comprising a connection between a terminal at an area to be monitored and a control and switching system, and the method comprising monitoring the connection between the control and switching system and the terminal, characterised in that the method further comprises detecting current feed in a power feed line of the connection, and giving an alarm to a pre-determined alarm monitoring system in response to detecting an increase of the current over a predetermined threshold value in the power feed line.

The invention provides a simple way to take care of connection control and a way to give an alarm. In addition, an existing ISDN network can be used. The error detector can be an ordinary sensor. A short-circuit can be accomplished by a closing switch. Monitoring devices can be flexibly added to the area to be monitored. In addition, an alarm can be transmitted through different ways to the desired place.

In the following, the invention will be described in detail by referring to the enclosed drawing, in which FIG. 1 presents, in general, a monitoring system according to the invention;

FIG. 2 presents a table according to an implementation, according to the invention, in a centre;

FIG. 3 shows an example of a message to an alarm centre;

FIG. 6 shows the stages of a method according to the invention.

DETAILED DESCRIPTION OF THE INVENTION

Figure 1:
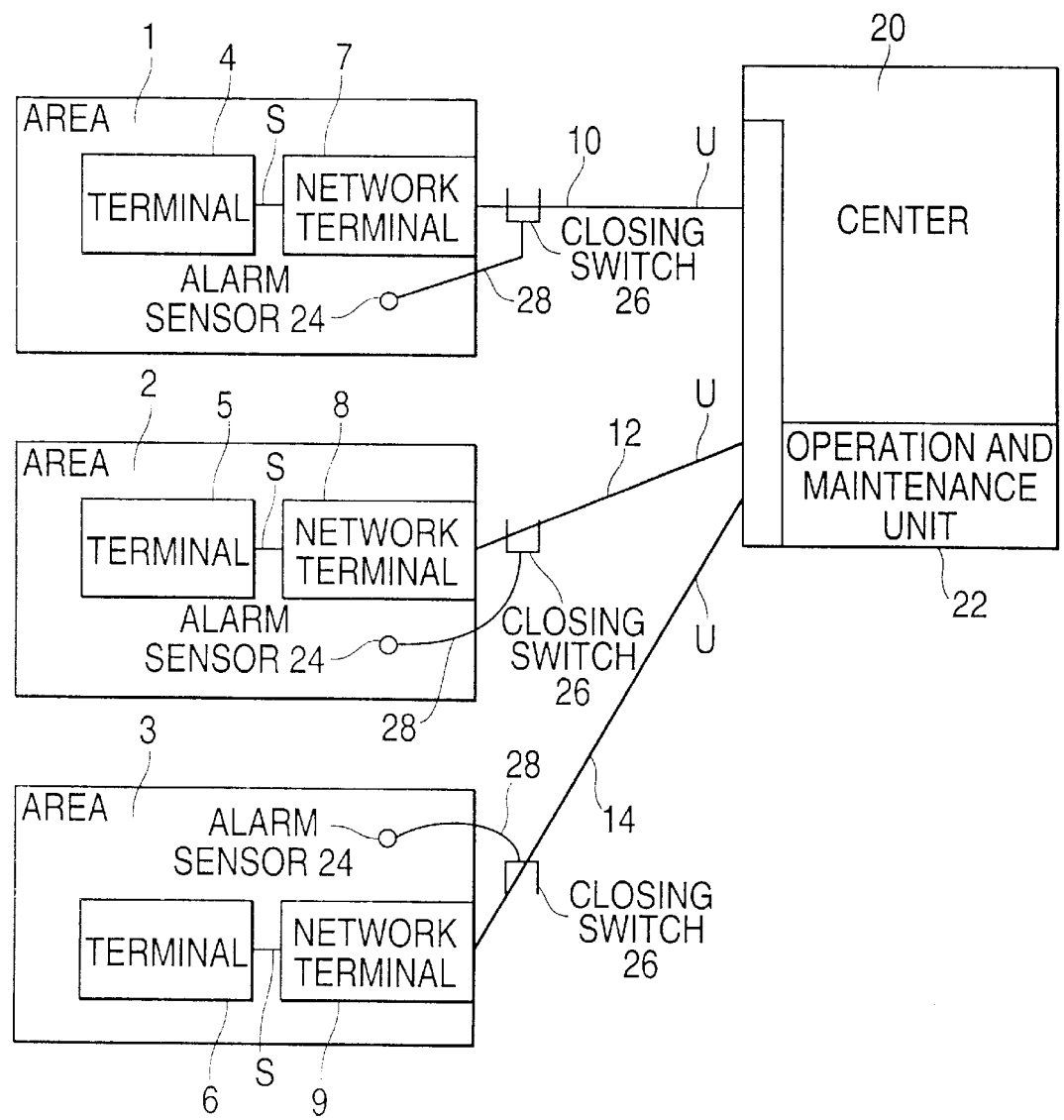

FIG. 1 shows subscriber line 10, 12, 14 which connect a centre 20 to network terminal NT1 7, 8, and 9 in an ISDN network. From the network terminal 7, 8, 9, there is a connection to a terminal 4, 5, 6 on area 1, 2, 3 to be monitored, which terminal in most cases is a telephone device. Generally, a subscriber is connected to the centre 20 with a copper twin cable 10, 12, 14. This line can be used either for PSTN (Public switched telephone network) or ISDN. PSTN subscriber can be changed into ISDN subscriber when the subscriber line is equipped with ISDN network terminal 7, 8, 9, and ISDN terminal 4, 5, 6, at the subscriber end, and the centre has ISDN access. Although we have presented here only three subscriber connections and only one centre, it will be appreciated that the telephone network consists of more nodes, subscriber connections and centres, which are connected to each other by links, respectively. It should also be noted that ISDN is part of the telephone network, which includes PSTN, PLMN (=Public land mobile network), and, nowadays, also packet-switched networks through which calls and information can be transferred.

In ISDN, the connection between the terminal 4, 5, 6 and the network terminal 7, 8, 9 is called S interface, also called S/T. The name of the interface of the subscriber line 10, 12, 14 is U interface. ISDN Digital Subscriber Signalling no. 1, DSS1, according to ETSI, is used between the terminal 4, 5, 6 and the centre 20, whereas a signalling system no. 7 ISDN user part (ISUP) is used for signalling between centres. The functionality of the U interface is implemented by 2B1Q or 4B3T line code. Other corresponding ones can also be used. ISDN connections are 2B+D or 30B+D, in which B represents the actual traffic channel for transferring subscriber information and D represents a channel for signalling and packet traffic. 2B+D is for households and 30B+D is for company PABXs. 2B+D contains the possibility to connect eight separate terminal equipments to the network terminal, which equipments may have different numbers.

In the telephone network, the centre 20 feeds current to the network terminal 7, 8, 9. In the centre 20, the current is being followed. If the magnitude of the current exceeds a given value, current feed will be terminated. An alarm is given or, before it, it is possible to try to put current feed on for a specific period of time. If current feed fails, an alarm is given to an I/O device (not shown) or the alarm is transferred to a desired destination. In the centre 20, the current value is normally followed in the centre's control functions, in an operation and maintenance unit (O/M) 22.

The operation and maintenance unit 22 has subscriber information. According to subscriber connection place information, it is possible to activate an alarm facility on/off, the information about who will be informed of the alarm, e.g. a telephone number, UUS (user-to-user signalling) message, a TCP/IP (transmission control protocol/Internet protocol) address (e-mail address). FIG. 2 shows in an exemplary manner a table 30, which has subscriber connection information, which contains a subscriber place number 32, an alarm facility activity column 34, which contains information of whether the service is active or not, as well as a contact information column 36 of the transmission of the alarm to a given number. In addition, it is possible to add information 38 of whether the notification of the alarm contains a message and what is to be sent to the alarm control in the capacity of UUS (user to user signalling) or e-mail message 39. In UUS, a text message is sent on a channel D onto the display of the desired terminal. It is also possible that the service data of one subscriber is on a so-called same card, whereupon the service data of one subscriber are displayed in one go from this card. FIG. 3 is a diagram that shows a message 68, which is sent to an alarm centre 50. The message contains the subscriber number 32. In addition to this, the message has an address 36 whereto the message is sent. The actual message part 38 may contain a UUS message, e.g. Alarm.

In the invention, an alarm is given if the ISDN subscriber line 10, 12, 14 is short-circuited or the ISDN subscriber line 10, 12, 14 is cut. The ways can be used either separately or simultaneously. The alarm is arranged so that the alarm sensors 24, which may include a door, temperature, motion, etc. detector or a push button, is directly connected to an ISDN physical layer, the U interface, by a opening and closing switch 26. The ISDN-subcribe line's 10, 12, 14 physical layer can be set continuously active, i.e. synchronization between the network terminal 7, 8, 9 and the centre 20 is on continuously. Although the connection does not have the existing network or data link layer connections an alarm can be detected if the subscriber line is cut. A continuously active layer can be implemented in digital switching centres, e.g. in a DX200™ centre, known for Nokia's trademark. If the ISDN network terminal 7, 8, 9 is detached from the subscriber line 10, 12, 14 or the subscriber line breaks or is cut, this will cause permanent loss of synchronization in the centre 20 which will cause an alarm in the center 20. The closing switch 26 that causes a short-circuit, causes a short-circuit in the subscriber line 10, 12 14 in question, which the centre detects as an alarm (subscriber power feed-off). The switch 26 is coupled to the alarm sensor 24 on area 1, 2, 3 to be monitored, with connection 28. The switch 26 can be a closing switch, e.g. a switch causing a twin cable line pair to short-circuit, a switch that short-circuits the different layers of a coaxial cable by pressing, etc.

A short-circuit is a subscriber line on/off-type alarm, to which no additional information that would be transmitted through the subscriber line 10, 12, 14, is related. No information passes through the subscriber line 10, 12, 14, when the line is short-circuited.The centre's (LT) maintenance function 22 detects the short-circuit of the subscriber line 10, 12, 14 and sets an alarm of it with the help of the required additional data (subscriber place, etc.) on an alarm printer and own tables, which can be read with the centre's operation control commands, an example of which is MML (man-machine language). Using an active 1., i.e. a physical layer is a safeguard against that, for example, in a case of a burglary, the line is cut, whereupon the actual alarm would be eliminated or that the line is damaged and the actual alarm system is not in operation. A parameter of its own can be defined for the use of this "protective measure" and it is only used at such objects, where protection is necessary. For example, if no malicious damage, etc. is expected to be done to the alarm system, it can be left switched off.

The switch 26 can be placed anywhere on the U interface 10, 12, 14, but most preferably in the immediate vicinity of the network terminal 7, 8, 9.

In the invention, functions by means of which an alarm can, e.g. be transmitted ("remote alarm") to a second subscriber connection 50 (e.g. to an alarm centre) can be added to maintenance. Filtering, delay, activation and other such functions can also be added to the remote alarm. The necessary additional data for these functions, which data can be configured to the connection, e.g. with MML commands, are added to the connection maintenance data. For example, short short-circuits, which can be supposed to be false alarms, can be filtered so that if, e.g. the error message has disappeared within five minutes, the alarm will not be transmitted forward to an alarm centre or to the desired connection 50.

As for the loss of synchronization, the operation is the same. Either information passes through the line 10, 12, 14 or it is off: On/off. When an alarm is on, i.e. synchronization is lost, no information can pass through the subscriber line 10, 12, 14.

LT (Line terminal) and ET (Exchange terminal) (and V1 interface between them) are all physically on an ISDN subscriber interface plug-in unit, LIDx, in the DX-200 centre 20. The card processes the line-related information and informs about possible faults/interferences when necessary with the internal communication methods of the centre 20, to the maintenance unit O&M 22.

Figure 4:
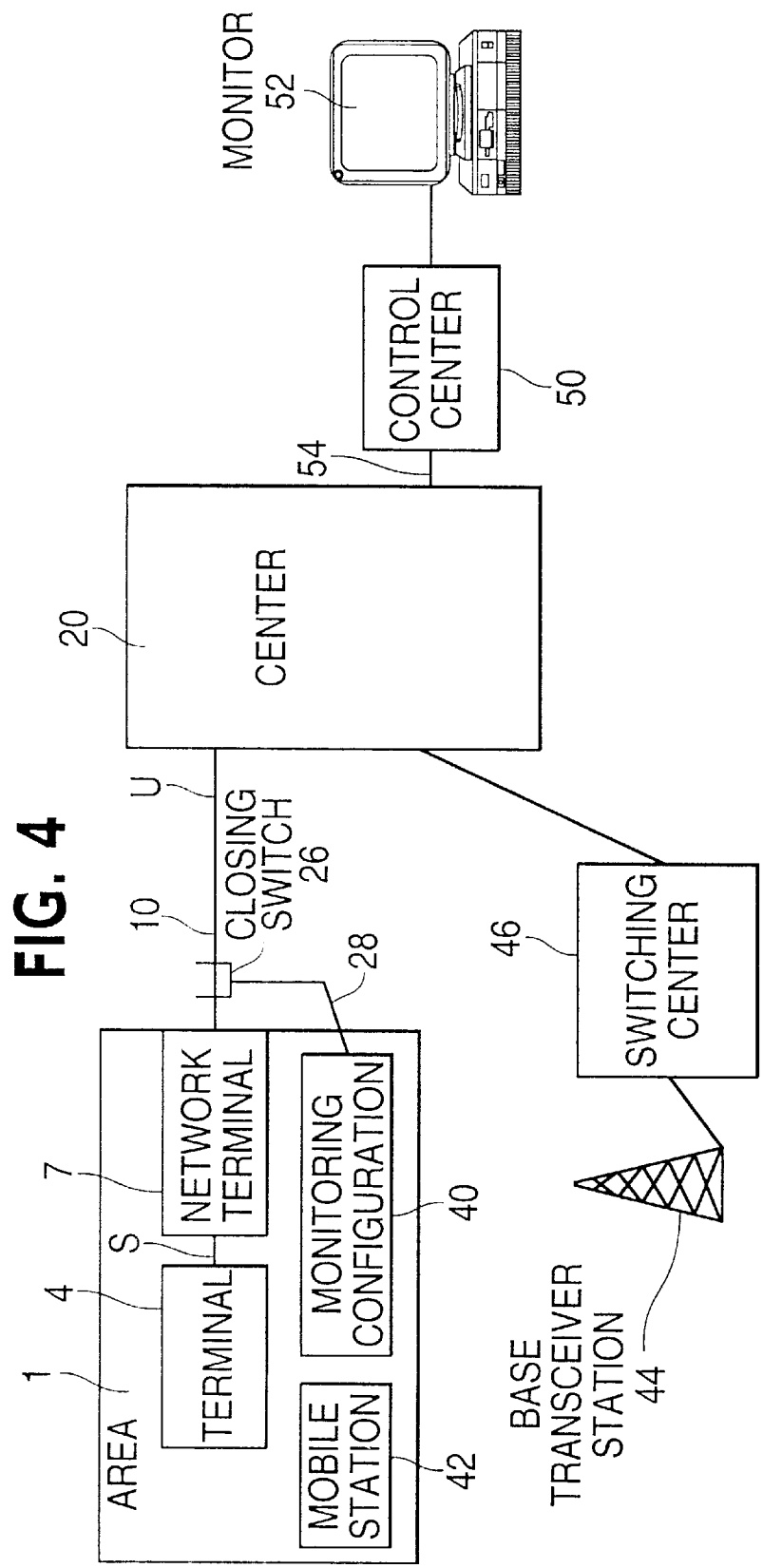
FIG. 4 shows one implementation of a solution of a monitoring configuration.

FIG. 4 shows one implementation of a solution where a camera and or a corresponding monitoring configuration 40 has been placed on the area to be monitored, which monitoring configuration can be activated if needed and, for example, when the message of the cutting of the line has reached the centre. The video camera 40 is in connection with a mobile station 42 from which there is a connection to a base transceiver station 44 and further to a mobile services switching centre 46. Image or sound can be transmitted to the control centre 50 through connection 54 between the centre 20 and the control centre 50, which control centre has a terminal with a monitor 52. The reason for the alarm can be found out and a decision can be made on whether the alarm presupposes that one should go onto the premises 1 to be monitored or whether the situation can be taken care of, e.g. from the control room. The length of a call coming from the premises 1 to be monitored can be limited to a few minutes. The call can be initiated either from the centre 20 or from the premises 1 to be monitored. The mobile station 42 can be integrated into the video camera 40.

The centre, where ISDN connections are line tested, has the alarm monitoring system address information corresponding to each ISDN connections.

Figure 5:
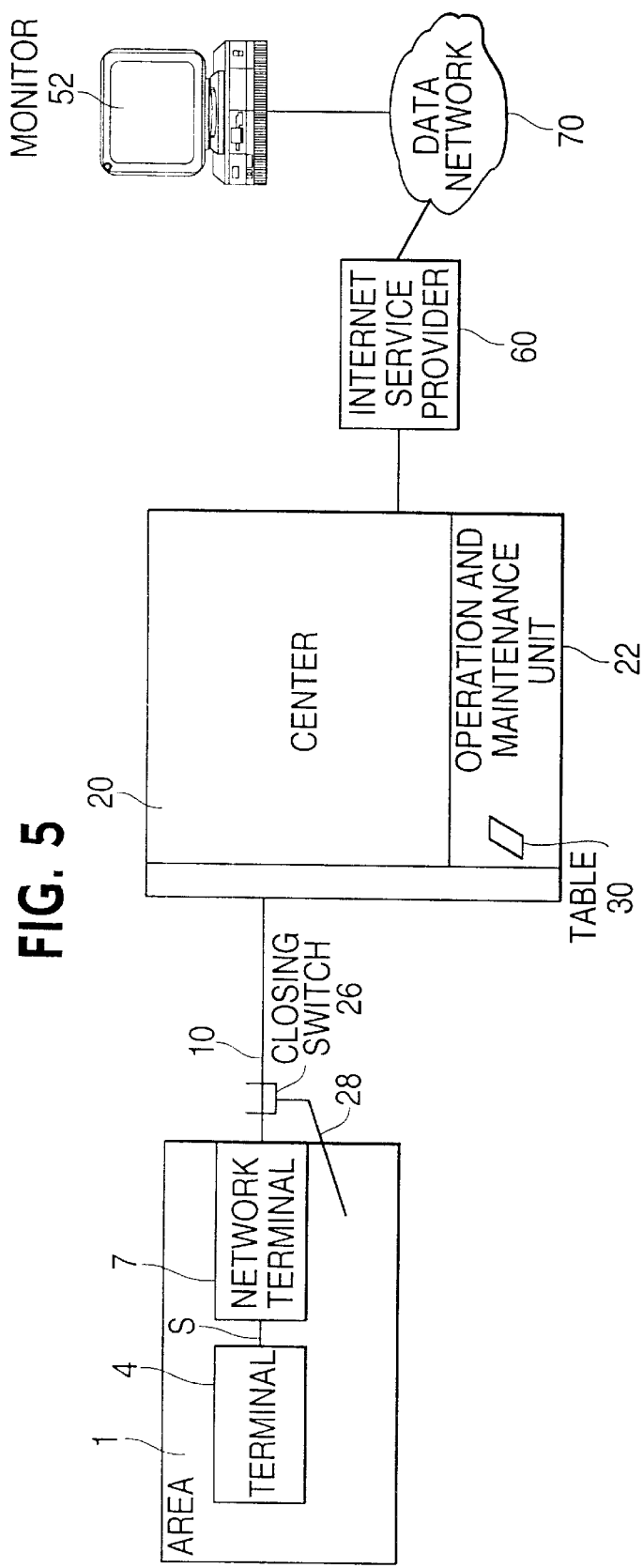
FIG. 5 shows an example of the transfer of alarm information to an IP (Internet Protocol) network.

FIG. 5 shows an example of the transfer of alarm information to an IP (Internet Protocol) network. When the subscriber line 10 (12, 14) is short-circuited, the alarm software is informed of both the alarm and the subscriber information, e.g. an ISDN number. The alarm program detects that the information about the alarm must be sent to an IP address, e.g. by e-mail. The alarm program establishes a connection to an Internet service provider 60, whereupon a connection is established with the alarm program of the centre 20 and the ISP 60 or in case it already is in connection or in a same data network 70, sends the e-mail to a pre-determined address, e.g. alarmltd@alarm.fi. A message is annexed to the e-mail, which is pre-determined in the table 30.

FIG. 6 shows the stages of a method of the invention, which comprise monitoring a connection between a control and switching system and an area to be monitored at stage 72; identifying a fault in the connection in the control and switching system at stage 74; directing an alarm due to the fault by the control and switching system through a second connection to a pre-determined alarm monitoring system at stage 76. An alarm is given on the basis of a response received of the fault in the connection between the area to be monitored and the control and switching system at stage 78.

This paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

What is claimed is:

1. An alarm system comprising:

a control and switching system;

a network terminal at an area to be monitored; and a first connection between the network terminal and the control and switching system, the control and switching system is arranged to monitor the first connection between the control and switching system and the network terminal, wherein the first connection comprises:

a power feed line for feeding power from the control and switching system to the network terminal, wherein the control and switching system is arranged to give an alarm to a pre-determined alarm monitoring system in response to detecting an increase of current over a predetermined threshold value in the power feed line, wherein the control and switching system is arranged to synchronized with the network terminal and comprises means for detecting a break off of the connection between the network terminal and the control and switching system by detecting loss of synchronization and the control system is arranged to give the alarm in response to detecting the loss of synchronization, wherein the alarm system further comprises:

a sensor in the area to be monitored, which sensor is, at its one end, connected with the first connection via a closing switch for causing a short-circuit in said connection, which short-circuit is arranged to be detected in the control and switching system from one of an increase of current feeding into the said first connection, and an increase of current feeding into the said first connection and loss of synchronization, and wherein the control and switching system is a switching center of a telephone network, and said short-circuiting switch is connected between the control and switching system and the ISDN subscriber line network terminal.

2. A system according to claim 1, wherein the first connection between the control and switching system and the network terminal is a telephone subscriber line.

3. An alarm system according to claim 1, wherein the network terminal is an ISDN-type network terminal, which has the first connection with the control and switching system via a subscriber line connection.

4. A system according to claim 3, further comprising:
   a second device at the area to be monitored; and
   a second connection between the second device and the control and switching system through a mobile network.

5. A system according to claim 4, wherein the control and switching system is arranged to establish the second connection between the second device and the control and switching system when an error message is received of the first connection.

6. A method for transferring alarms in an alarm system, the system including a connection between a network terminal at an area to be monitored and a control and switching system, said method comprising:
   monitoring the connection between the control and switching system and the network terminal;
   detecting current feed in a power feed line of the connection;
   giving an alarm to a pre-determined alarm monitoring system in response to detecting an increase of the current over predetermined threshold value in the power feed line;
   causing the alarm to be given by short-circuiting said connection with a closing switch;
   holding at the control and switching system a register which has information about subscriber data and addresses of alarm monitoring systems;
   giving said alarm by directing an error message to a predetermined alarm monitoring system based on the information in said register; and
   filtering false alarms by waiting at the control and switching system a predetermined period of time from having detected said increase in current before said error message about the alarm is transmitted to alarm monitoring system.

7. A method according to claim 6, further comprising:
   detecting the status of synchronization between the network terminal and the control and switching system in the control and switching system; and
   giving said alarm in response to detecting a loss of said synchronization.

8. A method according to claim 6, further comprising:
   transferring an alarm message to a computer network;
   sending the alarm message further to a pre-determined address; and
   annexing a message to the alarm message.

9. A method according to claim 7, wherein loss of synchronization is detected in response to one of detaching said terminal from a subscriber line, breaking of the subscriber line, and cutting of the subscriber line.

10. An alarm system comprising:
    a control and switching system;
    a network terminal at an area to be monitored; and
    a first connection between the network terminal and the control and switching system, the control and switching system is arranged to monitor the first connection between the control and switching system and the network terminal,
    wherein the first connection comprises a power feed line for feeding power from the control and switching system to the network terminal,
    wherein the control and switching system is arranged to give an alarm to a pre-determined alarm monitoring system in response to detecting an increase of current over a predetermined threshold value in the power feed line,
    wherein the control and switching system is a switching center of a telephone network, and said short-circuiting switch is connected between the control and switching system and the ISDN subscriber line network terminal, and
    wherein the network terminal is an ISDN-type network terminal, which has the first connection with the control and switching system via a subscriber line connection.

* * * * *